United States Patent [19]

Dotson et al.

[11] 4,110,629
[45] Aug. 29, 1978

[54] INDOOR AUTOMOBILE STARTING SYSTEM

[76] Inventors: James D. Dotson; Annette Jones, both of 2630 Bissonnet, #96, Houston, Tex. 77098

[21] Appl. No.: 706,054
[22] Filed: Jul. 16, 1976
[51] Int. Cl.² ............................................. B60R 25/10
[52] U.S. Cl. ........................... 290/38 R; 290/DIG. 3; 307/10 AT; 340/64; 123/179 BG
[58] Field of Search ................. 290/37 R, 38 R, 38 C, 290/DIG. 3, 36 R; 123/179 G, 179 B, 179 BG, 179 R; 307/9, 10 AT; 340/63, 64

[56] References Cited

U.S. PATENT DOCUMENTS

| 2,739,247 | 3/1956 | Pope | 290/DIG. 3 |
|---|---|---|---|
| 3,675,032 | 7/1972 | Shaheen | 290/DIG. 3 |
| 3,696,593 | 10/1972 | Thorud | 123/179 R |
| 3,767,932 | 10/1973 | Bailey | 290/38 |

Primary Examiner—James R. Scott
Assistant Examiner—William L. Feeney

[57] ABSTRACT

This system consists primarily of cable means, having wires which connect with a key operated and hand held device, which will enable the user to start an automobile from inside of the home or office. The cable means is plugable into an area in the front of the engine compartment of the automobile, the wires being connected to the starter, the ignition system, etc. The system includes flexible cable means so as to control the throttle of the engine carburetor.

4 Claims, 8 Drawing Figures

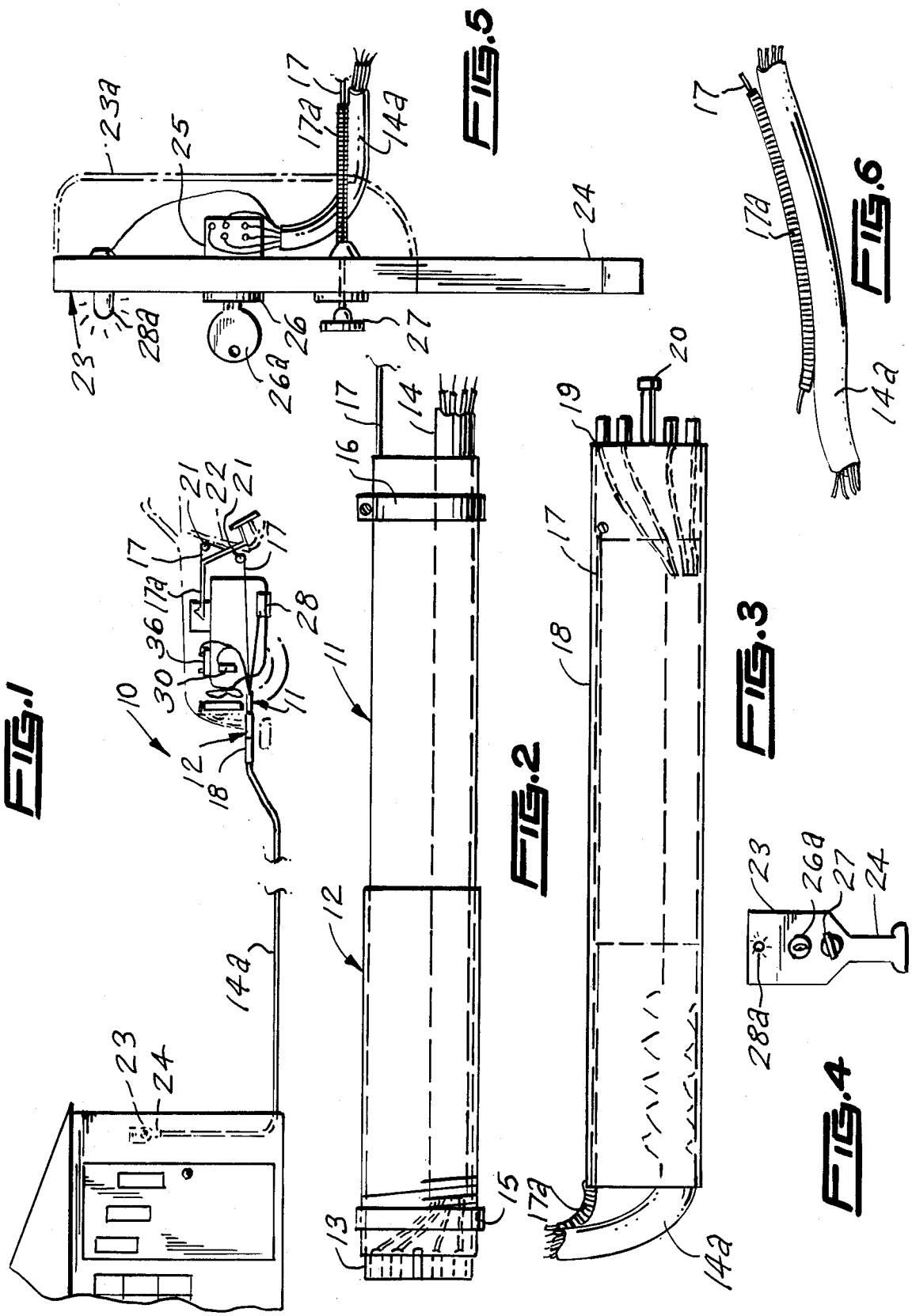

INDOOR AUTOMOBILE STARTING SYSTEM

This invention relates to automotive vehicles, and more particularly to an indoor automobile starting system.

It is, therefore, the principal object of this invention to provide an indoor automobile starting system, which will enable the user to start his automobile from a remote point, such as inside of the home or office.

Another object of this invention is to provide a system of the type described, which may be used in cold weather to start the automobile engine before departure, so as to enable the heater of the vehicle to warm the inside, while simultaneously enabling the engine to attain its normal operating temperature.

A further object of this invention is to provide a system of the type described, which may be used in warm weather, so as to enable the interior of the vehicle to be cooled by the air conditioner, prior to entering the vehicle, and the system will substantially increase the engine life.

A still further object of this invention is to provide a system of the type described, which will employ disconnect cable means, havinng having wires for connecting with the starter, etc. The system will include throttle control means for remotely operating the carburetor.

Other objects of the invention are to provide an indoor automobile starting system, which is simple in design, inexpensive to manufacture, rugged in construction, easy to use and efficient in operation.

These and other objects will be readily evident upon a study of the following specification and the accompanying drawings, wherein:

FIG. 1 is a side view of the present invention, shown installed within the engine compartment of a vehicle, and illustrates the disconnect cable means, which is attached to a key operated hand control device;

FIG. 2 is an enlarged plan view of the inner connector of the invention;

FIG. 3 is an enlarged plan view of the outer connector of the invention;

FIG. 4 is an enlarged front view of the handheld control member of the invention, shown in elevation;

FIG. 5 is an enlarged side view of FIG. 4, shown in elevation, with the rear cover shown in phantom lines;

FIG. 6 is a fragmentary plan view of the electrical cable and flexible cable of the invention;

Figures 7, 8:
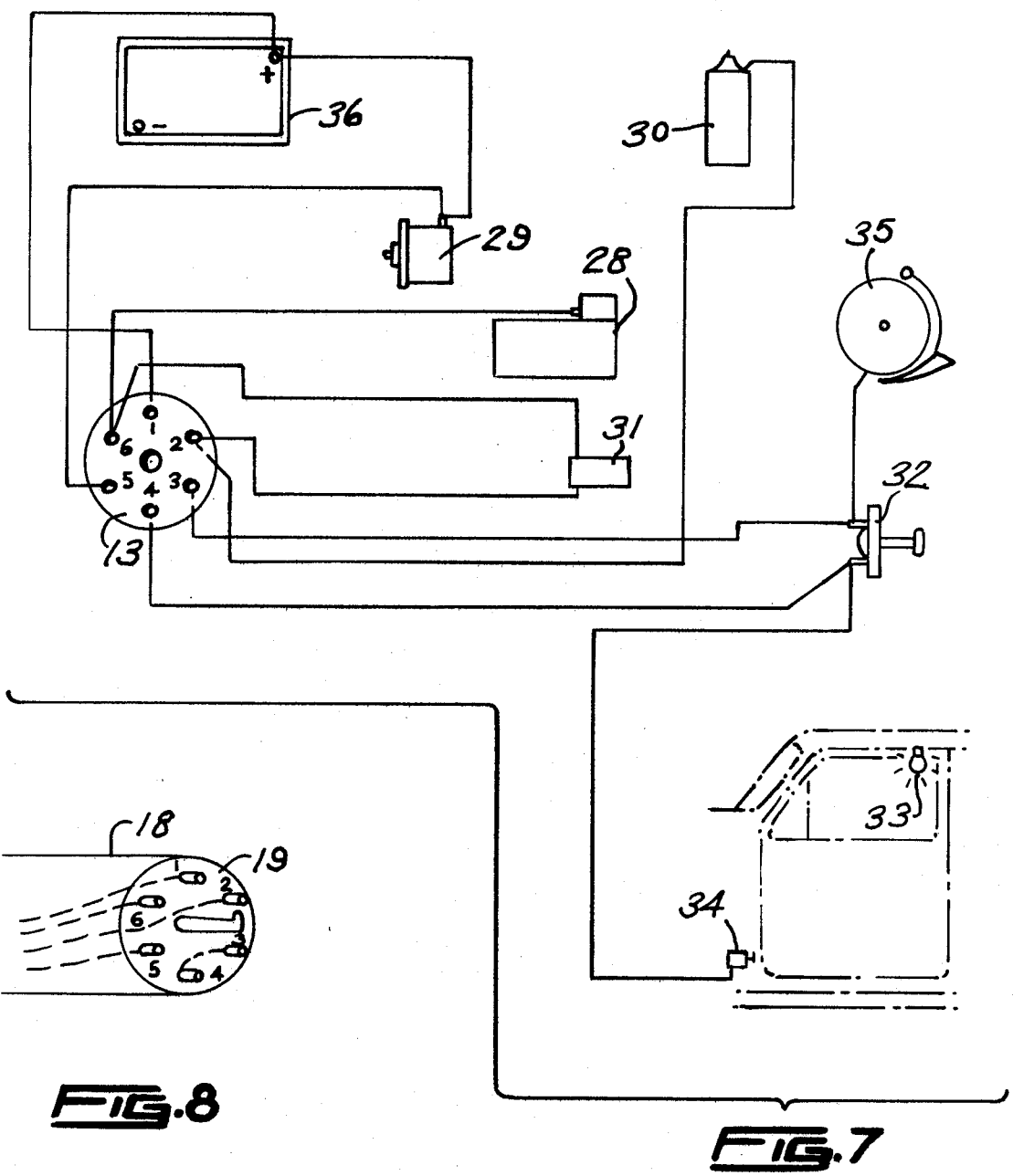
FIG. 7 is a schematic wiring diagram of the invention.
FIG. 8 is a fragmentary and diagrammatic front view of the outer male connector portion of the cable, which extends to the hand control means of the invention.

According to this invention, the starting system 10 is shown to include an inner pipe 11, which is slideable approximately three inches into outer pipe 12, having a female plug end 13. Cable 14 is received within pipes 11 and 12, and a lock fastener 15 threadably engages with pipe 12, so as to secure pipes 11 and 12 within the engine compartment of the vehicle. A clamp 16, secured to inner pipe 11, serves as a stop for the pipe 11 and 12 combination. A throttle control wire 17 is freely received within flexible cable 17a, and the flexible cable 17a is secured within the covering of cable 14a, received within outer connector 18, having a male plug end 19. Male plug end 19 is provided with a central inner lock pull-connector 20, which easily connects and disconnects with female plug end 13. Wire 17, of flexible cable 17a, is carried upon spaced apart pulleys 21, and is fixedly secured, at its end, to throttle control rod 17a. Pulleys 21 are fixedly secured to fire wall 22 of the automobile. The opposite end of cable 14a is secured within control device 23, having a handle grip 24. The end of cable 14a is covered by means of a suitable cover 23a, fastened to the rear of control device 23. A contact lock 25 is secured to the rear side of control device 23, in a suitable manner, and a lock 26 extends from control block 25, and is provided with a removable key 26a for starting the vehicle. The end throttle control wire 17 is secured fixedly to a knob 27 extending from control device 23, so as to control the throttle of the carburetor.

As is readily seen in FIG. 7 of the drawings, the wires, as indicated by the numerals 1 through 6, are secured to the positive side of the engine starter 28, the alternater 29 and the ignition coil 30. The positive side of starter 28 is connected to indicator light 28a. The starter 28 is connected to the bulb 28a, so as to indicate to the user that the generator is charging, and will also indicate that the automobile engine is running. The key 26a and the lock 26 of control device 23 serve as a means of closing the circuit to the starter 28 and the ignition system, the system being wired to the primary winding of the coil 30. The system 10 also connects with the transmission neutral switch 31, so as to prevent starting of the engine, unless the gear selector is in the neutral or park position.

System 10 is also wired to on-off switch 32, the dome light 33, and the button switch 34 of the vehicle, and with alarm 35. System 10 includes a connection with the positive post of the vehicle battery 36. Switch 26, of control device 23, is wired across starter 28 and the primary wiring of coil 30, so that normal engine starting will result, as though the user were in the vehicle. The on-off switch 32 is between the switch 34 and the dome light 33, and when in proper position, turns the light 33 and alarm 35 to an alarm system, when any door is opened when the two connectors are together. What I now claim is:

1. A remote control automobile starting system, comprising
   a hand-held and key operated control device,
   electrical cable means and throttle control means secured to said control device, and
   first disconnect plug means secured to said cable means,
   second disconnect plug means secured to telescoping pipe and cable means secured to said automobile,
   pulley means secured to said automobile, providing wire guide means for said throttle control to actuate the carburetor throttle, and
   electrical connection means connecting said second disconnect plug to the battery of said automobile, the starter, the ignition coil, the alternator, and the transmission neutral switch, for starting said car by operation of said key operated control device.

2. The combination according to claim 1, wherein said hand-held control device includes key switch means secured thereto and wires across said starter and the primary winding of the said ignition coil, said wires being secured within said cable means which is electrically secured to a contact block of said key switch, and the opposite end of said cable means is received within a cylindrical connector terminated by a male plug with an inner lock pull-connector, said male plug being removably received within a female plug end of said telescoping pipe means and the larger portion of said pipe means is externally threaded and receives a threaded fastener, for fastening said telescoping pipe means to the vehicle in conjunction with a spaced apart external clamp secured to the smaller portion of said telescoping pipe means and cable means carrying wires are secured to said female plug end of said telescoping pipe means and said cable extends into the engine compartment of said vehicle, the wires being suitably secured, individually to said battery of said vehicle, said alternater, said starter, said transmission neutral switch, said primary winding of said ignition coil, said on-off switch, said dome light, and door switch, and said alarm.

3. The combination according to claim 2, wherein said throttle control wire is slideable within flexible cable means which is secured fixedly to said cable within said outer connector having said male plug and said flexible cable is secured fixedly to said control device at one end, said throttle wire being secured fixedly to pull knob means on the face of said control device and the opposite end of said wire is freely received upon said pulleys, said pulleys being spaced apart and fixedly secured to the fire wall of said vehicle, the opposite end of said wire being secured fixedly to the throttle linkage rod of the carburetor of said vehicle and wire means from the positive side of said battery extends through said cable means through said contact block of said switch and to said starter, said primary winding of said ignition coil, said alternater, and said transmission neutral switch.

4. The combination according to claim 3, wherein said switch means of said control device is wired in parallel with said primary winding of said ignition coil and is wired in parallel across said starter, and bolt means secured within said control device is wired to the positive side of said alternater.

* * * * *